United States Patent [19]

McAvoy

[11] Patent Number: 4,844,030
[45] Date of Patent: Jul. 4, 1989

[54] THERMAL FATIGUE RESISTANT CYLINDER HEAD

[75] Inventor: Paul C. McAvoy, Columbus, Ind.

[73] Assignee: Cummins Engine Company, Inc., Columbus, Ind.

[21] Appl. No.: 178,857

[22] Filed: Apr. 7, 1988

Related U.S. Application Data

[63] Continuation of Ser. No. 808,358, Dec. 12, 1985, abandoned.

[51] Int. Cl.⁴ .................................................. F02F 1/24
[52] U.S. Cl. .............................. 123/193 H; 123/294; 123/432; 123/315
[58] Field of Search ................... 123/193 H, 302, 305, 123/308, 315, 432, 294, 188 M

[56] References Cited

U.S. PATENT DOCUMENTS

| | | | |
|---|---|---|---|
| 1,107,946 | 8/1914 | Hesselman | 123/193 H |
| 2,318,915 | 5/1943 | Anderson et al. | 123/308 |
| 2,791,989 | 5/1957 | Dickson | 123/193 CH |
| 2,893,371 | 7/1959 | Schafer | 123/657 |
| 3,117,565 | 1/1964 | Bottger et al. | 123/193 H |
| 3,861,375 | 1/1975 | Excoffon | 123/188 M |
| 3,865,087 | 2/1975 | Sihon | 123/188 M |
| 3,903,849 | 9/1975 | List et al. | 123/188 M |
| 4,337,735 | 7/1982 | Lichtner et al. | 123/193 H |
| 4,426,963 | 1/1984 | Lichtner | 123/193 H |
| 4,433,653 | 2/1984 | Lichtner et al. | 123/193 H |
| 4,484,550 | 11/1984 | Gadefelt | 123/315 |

FOREIGN PATENT DOCUMENTS

| | | | |
|---|---|---|---|
| 397840 | 8/1933 | United Kingdom | 123/302 |
| 2124702 | 2/1984 | United Kingdom | 123/193 H |

Primary Examiner—Willis R. Wolfe
Assistant Examiner—M. Macy
Attorney, Agent, or Firm—Neuman, Williams, Anderson & Olson

[57] ABSTRACT

A cylinder head for a valve-controlled internal combustion engine having a bottom surface which faces into an associated combustion chamber and a plurality of spaced valve openings therethrough and also an injector bore for induction of fuel or ignition spark through the combustion face of said cylinder head into the cylinder, said bottom surface or combustion face of said cylinder head having a circular cut-out portion located radially spaced between said injector bore and the center lines of said valve openings, with said cut-out possibly intersecting each of said valve openings.

11 Claims, 2 Drawing Sheets

THERMAL FATIGUE RESISTANT CYLINDER HEAD

This application is a continuation of application Ser. No. 808,358, filed Dec. 12, 1985, now abandoned.

The present invention relates to a cylinder head for a valve-controlled internal combustion engine.

As is known, in internal combustion engines a cylinder head forms the closed combustion chamber or cylinder in which a piston operates.

During operation, a load is repeatedly applied to the engine to generate power, with the power being harnessed to perform the work for which the engine is designed. During periods of high load operation, the combustion face of the cylinder head is exposed to high temperatures resulting from the combustion of fuel within the cylinder to produce power. However, between periods of high load operation the engine may operate at low load or operation of the engine may be stopped altogether. During periods when low or no load is placed on the engine, the combustion face of the cylinder head is not exposed to the very hot combustion environments as during periods of high load operation and cools to a significantly lower temperature. Furthermore, during loaded operation, thermally induced stresses of large magnitude may exist in the combustion face of the cylinder head resulting from the exposure to the hot environment, while thermally induced stresses of very small magnitude exist in the combustion face of the cylinder head in response to the generally cool environment during low or no load operation. The repeated cycling of the engine between a high load operating condition (hot cylinder temperatures and large stress magnitudes) and a low or no load condition (cool cylinder temperatures and low stress magnitudes) causes a state of alternating thermal stress to exist in the combustion face of the cylinder head. As a result of the thermally applied alternating stresses, cracks frequently form on the cylinder head combustion face. Usually these cracks extend across the narrow bridges between the valve openings, but may also exist emanating outward from a central injector bore used to induct fuel or ignition spark and extend toward the center lines of the valve openings.

It is a principal object of this invention to prevent cracking of the cylinder heads of internal combustion engines and the consequent failure thereof.

Other objects of the invention will be apparent from the following description and drawings in which.

The invention involves a cylinder head for a valve-controlled internal combustion engine having a bottom surface which faces into an associated combustion chamber and a plurality of spaced valve openings therethrough and also an injector bore for induction of fuel or ignition spark through the combustion face of said cylinder head into the cylinder, said bottom surface or combustion face of said cylinder head having a circular cut-out portion located radially spaced between said injector bore and the center lines of said valve openings, with said cut-out possibly intersecting each of said valve openings.

Figure 1:
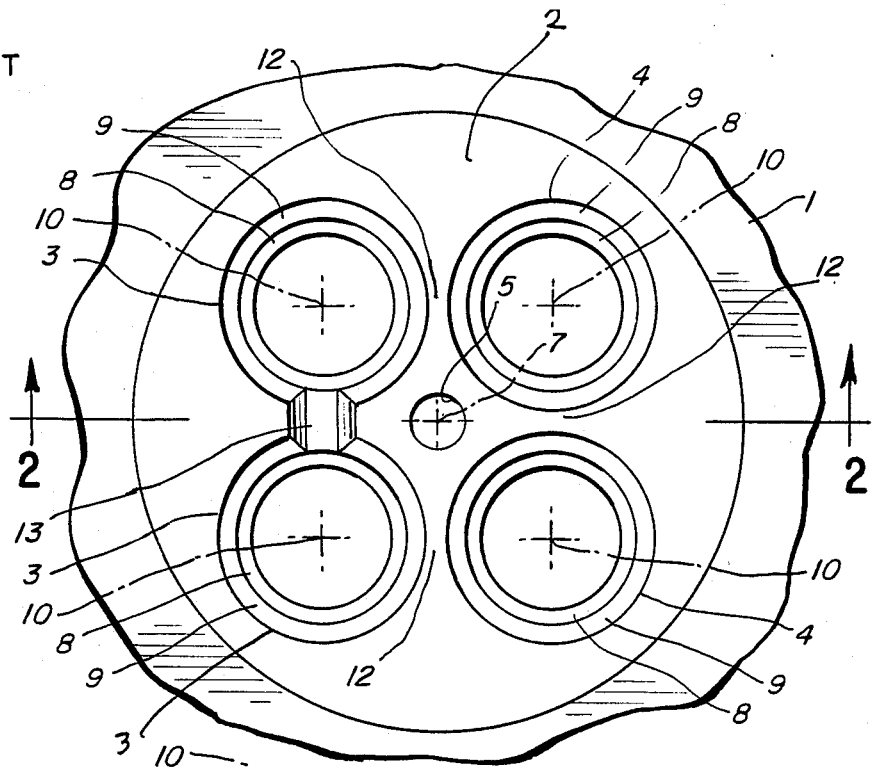
FIG. 1 is a plan view of a typical four valve cylinder head bottom.
Figure 2:
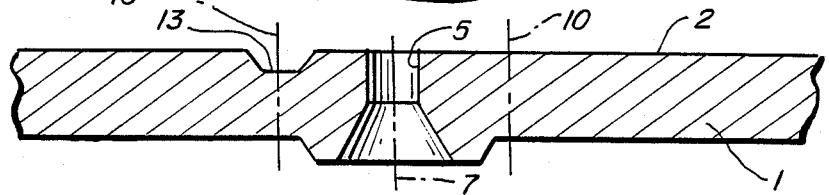
FIG. 2 is a view taken substantially on the line 2—2 of FIG. 1.

Referring to FIGS. 1 and 2, the illustrated typical four valve cylinder head 1 has a combustion face 2 which is sometimes referred to as the fire deck or combustion deck. Such a four valve cylinder head is typically used in high output diesel engines. The cylinder head combustion face 2 contains two exhaust valve openings designated by the numeral 3 and two intake valve openings designated by the numeral 4. As illustrated, an injector bore opening 5 is located centrally of the valve openings 3 and 4. Such an injector bore is typically used through which to induct fuel into the cylinder as in the case of spontaneous combustion high output diesel engines or through which to induct ignition spark as in the case of spark assisted gasoline engines. The center line of the injector bore 5 is designated by the numeral 7. Located inside each valve opening 3 and 4 is a valve seat insert 8, customarily composed of a high temperature alloy capable of resisting wear under repeated opening and closing of the valves. The valve seat insert 8 may be recessed from the combustion face 2 by means of a machined countersink 9. Between the valve openings 3 and 4 along the plane constructed through the valve center lines 10 are the relatively narrow regions of the cylinder head combustion face 2 typically referred to as valve bridges, these valve bridge portions being designated by the numeral 12. When the engine is repeatedly operated alternately between high load and low or no load conditions, the alternating thermal stresses frequently cause cracks in the combustion face. Typically, these thermally caused cracks will occur across the valve bridges 12 between the valve openings 3 and 4 on the plane joining the valve center lines 10. As a preventive measure, in the prior art a cut-out designated by the numeral 13 has been located at the center of the valve bridges 12 between the valve openings 3 and 4. In FIGS. 1 and 2, a single cut-out 13 is shown between the exhaust valve openings 3 as is most typical. In addition to previously mentioned cracks across the valve bridges 12, cracks may also exist emanating radially from the injector bore 5 extending across the cylinder head face 2 toward the center lines 10 of the valve openings 3 and 4. While the aforementioned cut-out 13 may effectively control cracking in the valve bridges 12, said cut-out 13 is ineffective in preventing formation of cracks emanating radially from the injector bore 5 and extending toward the valve openings 3 and 4.

Figure 3:
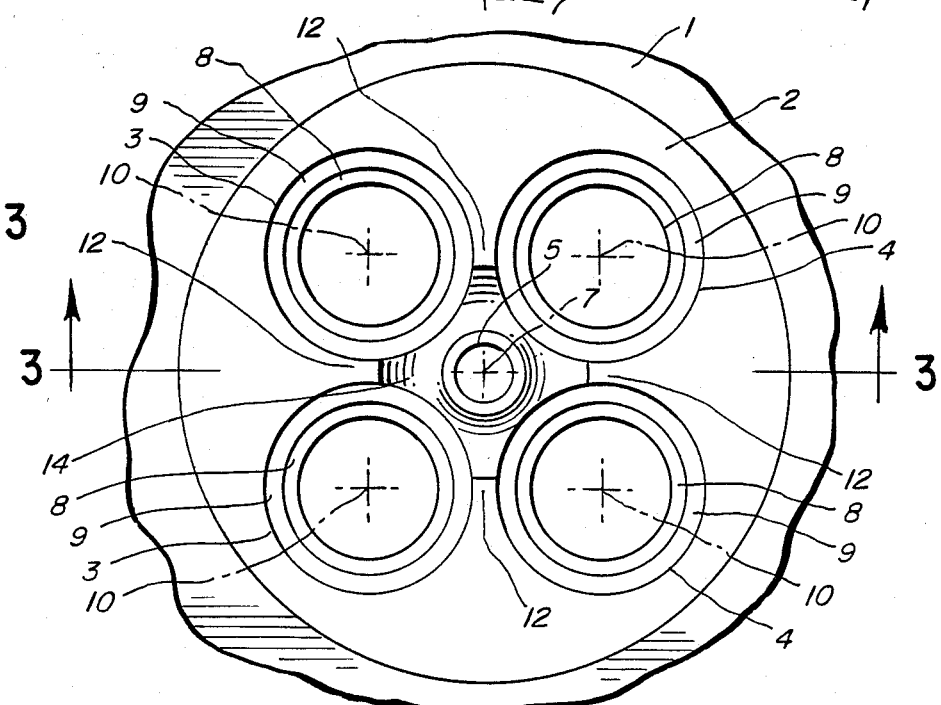
FIG. 3 is a plan view of a typical four valve cylinder head bottom formed in accordance with this invention.
Figure 4:
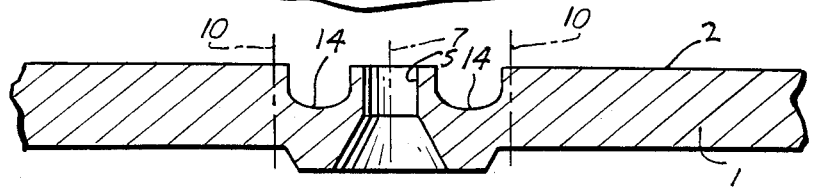
FIG. 4 is a view taken substantially on the line 3—3 of FIG. 3.
Figure 5:
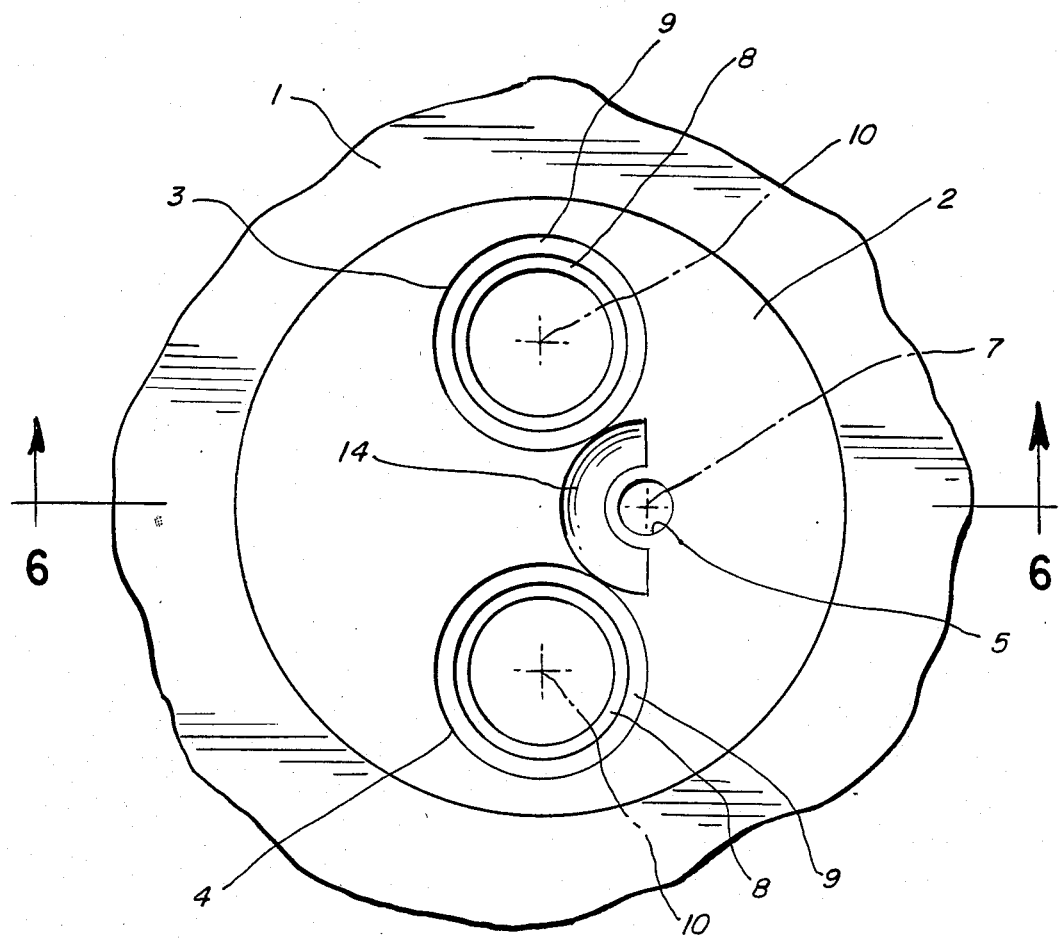
FIG. 5 is a plan view of a two valve cylinder head bottom formed in accordance with the invention.
Figure 6:
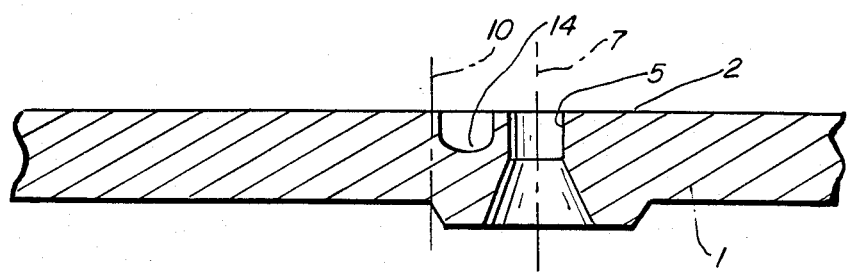
FIG. 6 is a view taken substantially on the line 5—5 of FIG. 5.

FIGS. 3 and 4 illustrate a cylinder head formed in accordance with the invention with the same numerals being used as in FIGS. 1 and 2 to designate identical elements. Thus, referring to FIGS. 3 and 4, the cylinder head combustion face 2 contains two exhaust valve openings designated by the numeral 3 and two intake valve openings designated by the numeral 4. An injector bore opening 5 is located centrally of the valve openings 3 and 4, typical of those used through which to induct fuel or ignition spark into the cylinder. The center line of the injector bore 5 is designated by the numeral 7. Located inside each valve opening 3 and 4 is a valve seat insert 8, customarily composed of a high temperature alloy capable of resisting wear under repeated opening and closing of the valves. The valve seat insert 8 may be recessed from the combustion face 2 by means of a machined countersink 9. Again, regions known as valve bridges 12 exist between the valve openings 3 and 4. In accordance with the invention, the combustion face 2 of the cylinder head is formed with a cut-out or trench 14, not to be confused with the cut-out 13 of FIGS. 1 and 2. The trench 14 is circular in shape and radially located between the injector bore 5 extending toward and possibly intersecting the valve openings 3 and 4. Thus, in the four valve cylinder head illustrated in FIGS. 3 and 4, the trench extends 360 degrees and forms an annular trench around the injector bore intersecting each of said valve openings. With other arrangements of the injector bore 5 and valve openings 3 and 4, the trench 14 need not extend 360 degrees, but can be a segment of a full circle sufficient that it spans each of the valve openings. Such an embodiment is shown in FIG. 5. Also, depending on the relative dimensions, including diameter of the injector bore 5, diameter of valve openings 3 and 4, and thickness of combustion deck 2, said trench 14 may or may not intersect said valve openings 3 and 4, but is always located radially between injector bore 5 and the center lines 10 of valve openings 3 and 4.

Referring to FIG. 5, there is illustrated a two valve cylinder head in which an intake valve opening 3 and an exhaust valve opening 4 are disposed within the cylinder head 1. As illustrated, the injector bore 5 is not located between the valve openings 3 and 4 but is offset from the plane which passes through the center lines 10 of the valve openings. With this arrangement, the trench 14 is a segment of a circle extending only a sufficient distance to span the valve openings 3 and 4. But again, as in the four valve case of FIG. 3, the trench 14 of the two valve configuration of FIG. 5 is located radially between the center line 7 of the injector bore 5 and the center lines 10 of the valve openings 3 and 4. As was stated for the four valve configuration, depending on the relative dimensions of the injector bore 5, valve openings 3 and 4, and combustion deck 2, the cut-out trench 14 for the two valve configuration may or may not intersect the valve openings 3 and 4.

In the cylinder head of this invention, trench 14 is radially displaced from the periphery of injector bore 5 a short distance so that the injector bore constitutes an uninterrupted cylinder, the end of which is flush with the combustion face 2 of the cylinder head. Preferably, the trench 14 is concave in shape, with its maximum depth being typically one-fifth to one-half the thickness of the combustion face 2.

While the trench 14 in FIGS. 3 through 6 may appear as a simple relocation of the common cut-out 13 of FIGS. 1 and 2, the trench 14 is unique in that the common cut-out 13 is placed in the valve bridge 12 centered on a line connecting valve center lines 10, while the trench 14 forms a circular cut-out or trench transversing the portions of the combustion face 2 lying between the injector bore 5 and the valve bridges 12. As such, the cut-out 13 of FIGS. 1 and 2 is able to prevent cracking by removing material from the valve bridges 12 where cracking would normally occur, but since no material is removed from the injector bore 5, no benefit is gained from the cut-out 13 in preventing cracking around the injector bore 5. In contrast, the circular cut-out trench 14 of FIGS. 3 through 6 removes material not from the valve bridges 12 or the injector bore 5, but traverses those portions of the combustion face 2 between the valve bridges 12 and injector bore 5. The trench 14 therefore effectively serves as a buffer zone or isolator preventing the thermal response of the injector bore from being communicated with the response of the valve bridges. Accordingly, the alternating thermal stresses due to cyclic operation of the engine between periods of high load and low or no load conditions applied to both the valve bridges and injector bore are reduced to minimize cracking of the combustion face in both the areas of the valve bridges and injector bore. This is accomplished by the invention without the necessity of forming the face of the cylinder head of multiple components and special materials, or the use of inserts therein.

Furthermore, the trench 14 should not be confused with small and shallow grooves, used singularly or multiply, as disclosed in the previous art which are also claimed to reduce thermal fatigue and cracking of cylinder head combustion faces. The purpose of these small and shallow grooves is to disrupt the highly localized surface stresses induced on the face of the cylinder head in response to the rapidly varying conditions within the cylinder as alternately hot combustion gases and cool charge air are introduced during each engine combustion cycle every one or two engine revolutions. Since these cyclic thermal in-cylinder conditions fluctuate very rapidly, only the very surface of the combustion face has time to respond, with the majority of the combustion deck unaffected by the high frequency in-cylinder transient. Due to the very localized response of the cylinder deck, very small shallow grooves of minor depth are sufficient to isolate the microscopic thermal response and prevent the cracking previously seen due to this high frequency cyclic loading. In contrast, the fairly deep trench 14 discussed herein alters the thermal stresses resulting from the macroscopic hot and cold states alternated between at fairly low frequency in response to varying demands for engine power and subsequently applied engine load. As engine load is varied, the entire combustion deck structure responds, not just the local surface layer exposed directly to the in-cylinder combustion cycle. While shallow grooves may be effective in minimizing localized surface cracking due to localized surface thermal stresses in response to high frequency in-cylinder combustion cycles, shallow grooves would be ineffective at preventing cracking due to the macroscopic overall thermal stress cycle induced by periodic operation between high and low frequency cyclic loading resulting from engine operation between states of high load and low or no load operation.

Those modifications and equivalents which fall within the spirit of the invention are to be considered a part thereof.

What is claimed is:

1. A cylinder head for a valve-controlled internal combustion engine having a bottom surface which faces into an associated combustion chamber and a plurality of spaced valve openings therethrough and also an injector bore through the cylinder head, said bottom surface of said cylinder head having a circular cut-out portion radially spaced from said injector bore in non-intersecting relationship and located between said injector bore and the center lines of said valve openings.

2. A cylinder head in accordance with claim 1 in which there are four spaced valve openings and the injector bore is located centrally of said valve openings.

3. A cylinder head in accordance with claim 2 wherein the circular cut-out portion is annular with respect to the injector bore.

4. A cylinder head in accordance with claim 3 in which the annular cut-out portion with respect to the injector bore intersects the valve openings.

5. A cylinder head in accordance with claim 1 in which there are two spaced valve openings.

6. A cylinder head in accordance with claim 5 wherein the injector bore is offset from the plane intersecting the centerlines of said valve openings.

7. A cylinder head in accordance with claim 6 wherein the cut-out portion does not intersect the valve openings.

8. A cylinder head in accordance with claim 6 wherein the cut-out portion intersects the valve openings.

9. A cylinder head in accordance with claim 6 wherein the circular cut-out portion forms a segment of a circle.

10. A cylinder head in accordance with claim 9 wherein the cut-out portion does not intersect the valve openings.

11. A cylinder head in accordance with claim 9 wherein the cut-out portion intersects the valve openings.

* * * * *

UNITED STATES PATENT AND TRADEMARK OFFICE
CERTIFICATE OF CORRECTION

PATENT NO. : 4,844,030

DATED : July 4, 1989

INVENTOR(S) : Paul C. McAvoy

It is certified that error appears in the above-identified patent and that said Letters Patent is hereby corrected as shown below:

Column 4, line 49, after "low" insert -- load conditions. Furthermore, said small shallow grooves being totally within the macroscopic thermal stress zone may potentially act as origination notches for cracks, aggravating cracking in response to the long-time, low --

Signed and Sealed this

Twenty-fourth Day of April, 1990

Attest:

HARRY F. MANBECK, JR.

*Attesting Officer*     Commissioner of Patents and Trademarks